Oct. 18, 1960   A. C. ENSIGN, JR., ET AL   2,956,446
ALTERNATE ACTION ARRANGEMENT
Filed March 26, 1958

*INVENTOR.*
ANGUS C. ENSIGN, JR.
ROBERT A. HEINRICH
BY
*ATTORNEY*

United States Patent Office 2,956,446
Patented Oct. 18, 1960

2,956,446

ALTERNATE ACTION ARRANGEMENT

Angus C. Ensign, Jr., Freeport, Ill., and Robert A. Heinrich, Maple Glen, Pa., assignors to Minneapolis-Honeywell Regulator Company, Minneapolis, Minn., a corporation of Delaware Filed Mar. 26, 1958, Ser. No. 724,069

5 Claims. (Cl. 74—503)

The present invention is directed to an alternate action arrangement for utilization with two relatively movable members, wherein upon successive relative movements therebetween, the members assume and are held in first one and then a second position.

As disclosed herein, an alternate action arrangement is provided wherein a housing member is associated with and arranged for relative movement with a driver member. Spring means are associated with the housing member and the driver member tending to provide relative movement therebetween in one direction. A third member is associated with one of the forementioned members and arranged for relative movement with the forementioned members transverse to the relative movement between the forementioned members. The third member includes an irregularly shaped groove on the surface thereof arranged for cooperation with the extremity of a pin associated with the other of the members. The groove is comprised of a plane surface disposed between parallel wall surfaces and a drop-off or distinct change in elevation for each abrupt change in direction of the groove. While the groove may take any number of forms, the single embodiment disclosed herein is provided with a cardioid shaped groove. Thus, relative movement between the housing member and the driver member results in an interaction between the extremity of the pin and the groove and a relative movement between the third member and the first and second members so that upon a first relative movement between the housing member and the driver member against the bias of the spring means, the members move to and are held in a first position wherein the extremity of the pin rests in the apex of the groove and is associated with one of the drop-offs which prevents retrograde movement. Upon a subsequent relative movement under the bias of the spring means, the members move to and are held in a second position by appropriate stop means. In the second position, the extremity of the pin rests in a second portion of the groove and is associated with a second of the drop-offs.

By utilizing a groove construction as set forth above, a very positive positioning means is provided between the housing member and the driver member tending to maintain the members in place against the effects of vibration, impact, etc. Further, by utilizing the teaching of the present invention, a groove can be provided which is very smooth insofar as its outline is concerned, inasmuch as no off-sets between the outer wall and inner wall of the groove are required, as is the case with other alternate action arrangements incorporating a cardioid groove. Also, the incorporation of a third member for cooperation with the housing member and the driver member, allows for relative movement between the housing member and the driver member in only one plane. This advantage can be important when the teaching is incorporated in push button actuated devices, wherein it is desired that there be no relative movement between the force input member and the driver member.

Therefore, it is an object of this invention to provide an alternate action arrangement wherein a positive positioning action is provided between two relatively movable members by utilizing a guide pin interacting with an irregularly shaped groove comprised of a plane surface and a drop-off for each abrupt change in direction of the groove.

It is another object of this invention to provide an alternate action arrangement wherein a cardioid groove is associated with two relatively movable members, which groove comprises a plane surface disposed between parallel wall surfaces and a drop-off for each abrupt change in direction of the groove, which groove interacts with a guide pin to provide the alternate action.

A further object of this invention is to provide an alternate action arrangement wherein no relative movement between the driver member and a force input member results upon operation of the arrangement.

These and other objects will become apparent from a reading of the following specification and appended claims in which, Figure 1 is a view of a push button switch;

Figure 1:
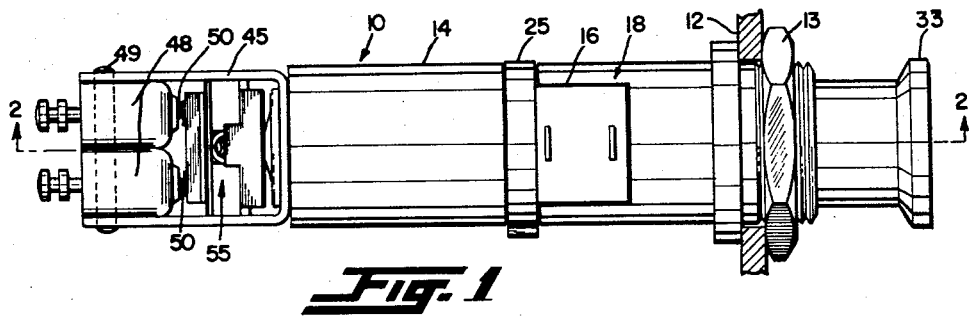
Figure 2:
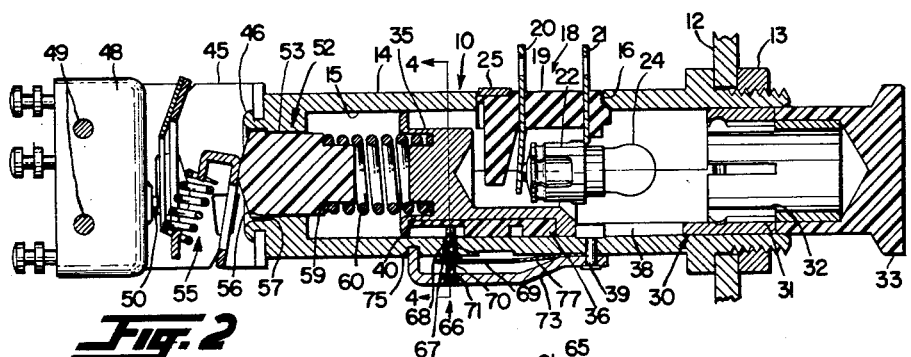
Figure 2 is a sectional view of the switch of Figure 1 taken along the lines 2—2 thereof showing, among other things, the housing member, the driver member, and the third member or segment.

In Figures 1 and 2, an illuminated push button switch 10 is shown mounted to a panel 12 by means of a nut 13. The switch 10 includes a tubular housing 14 having an inner periphery 15. An opening 16 is provided in a wall portion of the housing 14 and is arranged to accommodate illumination means 18 comprised of an insulating body 19 in which terminal member 20 and terminal member 21, to which a socket 22 is operatively fastened, are appropriately disposed. A light bulb 24 is located in the socket 22. The peripheral surfaces of the insulating body 19 rest on the opening 16 provided in the housing 14. A retaining ring 25 is disposed about a portion of the housing 14 and is arranged to maintain the illumination means 18 in place. The structure of and the mounting and securing of the illumination means is more completely discussed in the co-pending Campe and Ensign application, Serial No. 654,827, filed April 24, 1957.

Figures 4, 5:
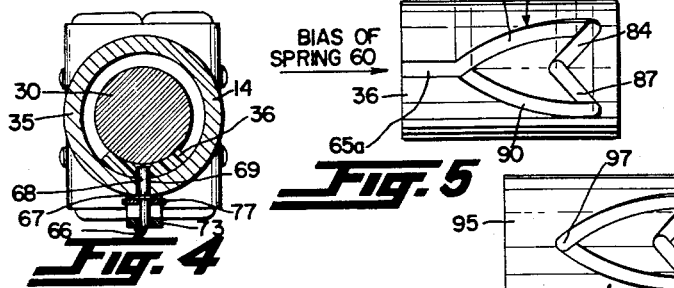
Figure 4 is a sectional view taken along the lines 4—4 of Figure 2 showing the relation between the housing member, the driver member, and the segment.
Figure 5 is an enlarged view of the segment showing the cardioid groove.
Figure 6:
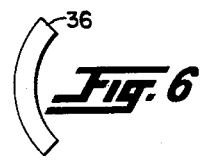
Figure 6 is an end view of the segment shown in Figure 5.
Figure 3:
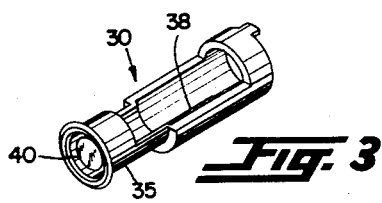
Figure 3 is a perspective view of the driver member shown in Figure 2.

Located within the inner periphery 15 of the housing 14 and arranged for relative movement therewith is a driver member 30 which includes a portion having an inner periphery 31 in which a spring detent 32 associated with a push button 33 is disposed. For a clearer showing of the driver member 30, reference should be made concurrently to Figure 3. The driver member 30 is generally tubular in shape, but has a portion thereof cut away so as to accommodate the illumination means 18. For a more detailed discussion of the inter-relation between the driver member 30 and the illumination means 18, attention is drawn to the forementioned Campe and Ensign application. A circumferential groove 35 is provided near one end portion of the driver member 30 so as to accommodate a tubular segment 36, the form of which is best shown in Figures 4, 5, and 6. The width of the groove 35 is such that the segment 36 is limited to arcuate movement only about the periphery of the groove 35. A longiudinal slot 38 is provided in the driver member 30 for cooperation with a stop member 39 secured in the housing 14. The end portion containing the circumferential groove 35 also includes a counterbore 40.

A U-shaped frame 45 is staked to the housing 14 at 46. A pair of snap switches 48 are located between the arms of the frame 45 and held in place by means of rivets 49. Between plungers 50 of the snap switches 48 and plunger 52 slidable in an opening 53 of the housing 14, there is disposed an overcenter toggle mechanism 55. A shoulder 56 located on the plunger 52 cooperates with a shoulder 57 provided in the housing 14 to limit movement of the plunger 52 due to the bias of the toggle mechanism 55. Between a shoulder 59 of the plunger 52 and the bottom of the counterbore 40, a coil spring 60 is located which always tends to move the driver 30 so that the leftward extremity of the longitudinal slot 38 is against the stop member 39.

As best shown in Figure 5, the segment 36 includes an irregularly shaped groove in the general shape of a cardioid 65. The side walls of the groove 65 are parallel to each other. This results in a groove having smooth outlines and without offsets between corresponding wall portions. A more detailed description of the groove 65 will be given below in regard to the operation of the push button switch 10 and the alternate action arrangement associated therewith. Referring again to Figure 2 and also to Figure 4, a guide pin 66 is shown having a shoulder 67. The pin 66 also includes a first portion 68 disposed in a complementary opening 69 of the housing 14, the iner extremity thereof being disposed in the groove 65 of the segment 36. A second portion 70 of the pin 66 cooperates with an opening 71 located in a frame 73 one end of which is held to the housing 14 by the stop member 39, the other end of which is disposed in a notch 75 located in the housing 14. A biasing member in the form of a leaf spring 77, one end of which is held against the housing 14 by the stop member 39, constantly biases the inner extremity of the first portion 68 of the guide pin 66 into the groove 65.

Actuation and deactuation of the push button switch 10 is accomplished by successive movements of the push button 33 toward the housing 14.

Thus, an initial depression of the push button 33 from the position shown in Figure 2, caused by an external force input member, results in the driver member 30 moving to the left, thereby applying a force to the spring 60 which causes movement of the plunger 52 and the toggle mechanism 55 to move the plungers 50 of the snap switches 48 from the position shown to a second position. During this movement of the forementioned elements, the longitudinal slot of element 38 of driver 30 has of course moved with respect to the stop member 39. Also, the groove 65 of segment 36 has interacted with the inner extremity of the first portion 68 of the guide pin 66 resulting in relative movement of the segment 36 about the circumferential groove 35 of the driver member 30, which relative movement is transverse to the relative movement between the driver member 30 and the housing member 14. Upon removal of the actuating force from the push button 33, the forementioned elements remain in substantially the same position due to the alternate action mechanism, the description and operation of which appears below.

Figure 7:
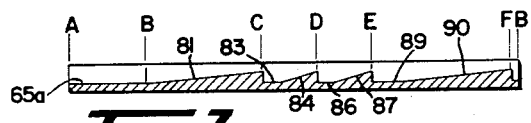
Figure 7 is a developed elevation of the groove of the segment shown in Figure 5.

The alternate action is accomplished by the interaction between the segment 36 and the guide pin 66. The cardioid groove 65 of the segment 36 is comprised of a number of inclined planes and abrupt drop-offs, as can be seen from an examination of Figure 7. Actually, Figure 7 is a developed elevation A—B—C—D—E—F generally corresponding to the path A—B—C—D—E—F of the groove 65 of Figure 5. In Figure 5, an arrow shows the direction of the bias supplied by spring 60 acting on segment 36.

Initially, in the position shown in Figure 2, guide pin 66 is located at station B, the portion 65a of the groove 65 from station A to station B merely being provided to allow introduction of the pin into the cardioid portion of the groove 65. Upon movement of the push button 33, and consequently driver member 30 and segment 36, successive elements of inclined plane 81 pass the inner extremity of the first portion 68 of the guide pin 66, thereby causing outward movement of the guide pin 66 against the bias of the spring 77. The resulting cam action causes movement of segment 36 about the circumferential groove 35, as was mentioned previously. Continued inward movement of the push button 33 eventually results in the inner extremity of the first portion 68 encountering the maximum elevation point of inclined plane 81 at station C. A further movement of the push button 33 causes the guide pin 66 to drop off the point of maximum elevation due to the action of spring 77. The inner extremity of the first portion 68 now engages the plane 83. This is the point which corresponds to the maximum inward position of the actuating arrangement of the push button switch 10. Removal of the actuating force from the push button 33 results in the inner extremity of the first portion 68, against the bias spring 77, riding up the inclined plane 84 to station D, as the segment 36 moves outwardly due to the action of the spring 60. Upon station D and the drop-off being encountered and passed, the spring 77 forces the inner extremity of the first portion 68 against plane 86. With the arrangement in this position, no further relative movement between the segment 36 and the pin 66 is possible until an adequate actuating force and movement is again applied to push button 33. It will be noted that the spring 60 tends to drive the guide pin 66 into the apex formed by planes 84 and 86 and the drop-off at station D. Further, the drop-off at station D limits retrograde movement of segment 36 with respect to the guide pin 66. Similarly, the inclined surface presented by inclined plane 87 limits overtravel movement of the segment 36 with respect to the guide pin 66. Thus, a positive positioning or holding arrangement is provided.

A subsequent depression of the push button 33 causes an interaction between the segment 36 and the guide pin 66 causing a release of the positive positioning or holding arrangement, and the push button 33 and the driver member 30 are allowed to return to the initial position shown in Figure 2, whereby the leftward extremity of the longitudinal slot 38 once more encounters stop member 39, the plungers 50 of the snap switches 48 are moved to the first position and the toggle mechanism 55, plunger 52 and spring 60 assume the positions shown in Figure 2.

With specific reference again to Figures 5 and 7, the above described subsequent depression results in a movement of the segment against the bias of spring 60 so that the successive elements of inclined plane 87 in moving past the inner extremity of the first portion 68, results in the guide pin 66 being moved outwardly against the bias of spring 77. As station E and the drop-off associated therewith are encountered and passed, spring 77 forces the inner extremity of the first portion 68 against plane 89. This position of the guide pin 66 with respect to the groove 65 of the segment 36 corresponds to the maximum inward position of the actuating arrangement of the push button switch 10 when the drop-off at station C was encountered, in that removal of the actuating force from the push button 33 results in the driver member 30 and the segment 36 being driven under the bias of the spring 60 to an ultimate position, in this case past the drop-off at station F. In getting to station F, the guide pin 66 is moved outwardly against the bias of spring 77 as successive elements of inclined plane 90 move past the inner extremity of the first portion 68. As station F is passed, the guide pin 66 and the segment 36 are in their initial positions at station B. Successive depressions of the push button 33 results in the cycle being repeated.

It will be noted that the alternate action is accomplished by means of a groove 65 located on a moving segment 36 and a pin limited to movement in a plane normal to the groove 65. With such an arrangement, there is no need for relative rotational movement between the driver member 30 and the housing member 14, and consequently between the push button 33 and the external force input member, whether manual or otherwise. With the driver member 30 limited against relative rotational movement with respect to the housing member 14, it is possible to utilize illumination means which are secured to the housing member 14, such as disclosed in the forementioned Campe and Ensign application and set forth herein. Inasmuch as there is no relative rotational movement between the driver member 30 and the housing member 14, there is no possibility of the driver member 30 engaging the illumination means 18 to cause interference therebetween.

While the groove 65 of the segment 36 shown in Figure 5 includes an introductory portion 65a, such could be dispensed with should it be desired to utilize the guide pin 66 for the stop means rather than stop member 39. Thus, in Figure 8, a segment 95 is shown including a closed cardioid groove 96. It is obvious that if the stop member 39 be dispensed with, the guide pin 66 could so function when resting in the apex 97 of the groove 96 and when under the bias of the spring 60.

Figure 8:
Figure 8 is a view of a modified segment showing a closed cardioid groove.

While the grooves shown in Figures 5 and 8 of the disclosure are in the form of a cardioid, it is obvious that other grooves could be utilized to provide the alternate action. The only limitations in the shape of the groove being that the groove returns upon itself and the groove be comprised of at least four distinct plane surfaces and a drop-off associated with each and wherein a trace following the plane surfaces of the groove moves successively in substantially opposite directions as succeeding plane surfaces are encountered. Further, although the grooves 65 and 96 in the present disclosure are located on a third member or segment 36 or 95, should it be desired, these grooves could be associated with the housing member 14 or the driver member 30. To so do, of course, would introduce a relative movement between the driver member 30 and the push button 33 and the external force input member, but, in certain instances, this may not be objectionable.

Further, while the alternate action arrangement has been discussed in regard to a push button switch device, it is obvious that a device could be provided utilizing the alternate action arrangement disclosed herein wherein the driver member 30 is caused to be rotated relative to the housing member 14. Thus, the segment 36 or 95 could be limited against peripheral movement with respect to driver member 30 and be arranged for longitudinal movement therewith as regard Figure 2. With this type of device, the groove on the segments 36 or 95 would be located at 90° to the location shown in Figures 5 and 8.

Many other modifications utilizing the teaching of the present invention are possible. Therefore, the scope of the present invention should be determined from the following claims.

We claim:

1. An alternate action arrangement, the combination comprising; a tubular housing; a cylindrical driver slidably disposed in said housing and arranged for reciprocal movement relative thereto and limited against oscillatory movement relative thereto; spring means disposed between said housing and said driver tending to provide relative reciprocal movement therebetween in one direction; a stop member associated with said housing for limiting the action of said spring means; a tubular segment located in a complementary circumferential groove disposed about the outer periphery of said driver and arranged for oscillatory movement relative thereto, said segment including a cardioid shaped groove disposed in the outer peripheral surface thereof and consisting of an inclined plane and an abrupt dropoff for each of the abrupt changes in direction of the groove; a guide pin radially disposed in a complementary opening in said housing; and a spring member associated with said housing biasing said pin so that an extremity thereof is maintained in the cardioid groove of said segment; reciprocation of said driver and said segment carried thereby resulting in oscillation of said segment in the circumferential groove of said driver due to the interaction of the cardioid groove of said segment and the extremity of said pin.

2. An alternate action arrangement, the combination comprising; a first member; a second member slidably disposed with respect to said first member and limited to movement relative thereto in a single plane; spring means disposed between said first member and said second member tending to provide relative movement therebetween in one direction; stop means for limiting the action of said spring means; a third member located in a depression disposed in the mating surface of said first member and limited to movement relative to said members transverse to the relative movement between said first and second members, said third member including a cardioid shaped groove disposed on the surface thereof facing the mating surface of said second member and consisting of an inclined plane and an abrupt dropoff for each of the abrupt changes in the direction of the groove; and a pin disposed in a complementary opening in said second member, said third member and said pin biased toward each other so that an extremity of said pin is maintained in the groove of said third member; relative movement between said first member and said second and said third members resulting in relative movement between said first and second members and said third member due to the interaction between the groove of said third member and the extremity of said pin.

3. An alternate action arrangement, the combination comprising; a first member; a second member slidably disposed with respect to said first member and limited to movement relative thereto in a single plane; spring means disposed between said first member and said second member tending to provide relative movement therebetween in one direction; stop means for limiting the action of said spring means; a third member located in a depression disposed in the mating surface of said first member and arranged for movement relative to said members transverse to the relative movement between said first and second members, said third member including a groove disposed on the surface thereof facing the mating surface of said second member, said groove returning upon itself and consisting of at least four distinct surfaces and an abrupt dropoff at the extremity of each surface, a trace following the surfaces of said groove moving successively in substantially opposite directions as succeeding surfaces are encountered; and a pin disposed in a complementary opening in said second member, said third member and said pin being biased toward each other so that an extremity of said pin is maintained in the groove of said third member; relative movement between said first member and said second and said third members resulting in relative movement between said first and second members and said third member due to the interaction between the groove of said third member and the extremity of said pin.

4. An alternate action arrangement, the combination comprising; a first member; a second member slidably disposed with respect to said first member and limited to movement relative thereto in a single plane; a third member located in a depression disposed in the mating surface of said first member and arranged for movement relative to said members transverse to the relative movement between said first and second members; a pin disposed in a complementary opening in said second member; said third member including a groove disposed on the surface thereof facing the mating surface of said second member; an extremity of said pin being maintained in the groove of said third member to cooperate therewith to accomplish alternate action; spring means disposed between said first member and said second member tending to provide relative movement therebetween in one direction; and stop means for limiting the action of said spring means; relative movement between said first and said second members and said third member resulting in relative movement between said first and second members and said third member due to the interaction between the groove of said third member and the extremity of said pin.

5. An alternate action arrangement, the combination comprising; a first member; a second member slidably disposed with respect to said first member and limited to movement relative thereto in a single plane; a third member associated with said first member and arranged for movement relative to said members transverse to the relative movement between said first and second members; spring means disposed between said first member and said second member tending to provide relative movement therebetween in one direction; and stop means for limiting the action of said spring means; said second and third members each including cooperable means for accomplishing alternate action; relative movement between said first member and said second and said third members resulting in relative movement between said first and second members and said third member due to the interaction between the means of said third member and the means of said second member.

References Cited in the file of this patent

UNITED STATES PATENTS

| | | |
|---|---|---|
| 1,352,889 | Gallo et al. | Sept. 14, 1920 |
| 2,622,561 | Baker | Dec. 23, 1952 |
| 2,671,354 | Goos | Mar. 9, 1954 |
| 2,703,348 | Knapp et al. | Mar. 1, 1955 |
| 2,865,333 | Hechtle | Dec. 23, 1958 |

FOREIGN PATENTS

| | | |
|---|---|---|
| 162,533 | Austria | Mar. 10, 1949 |
| 1,010,739 | France | Mar. 26, 1952 |
| 1,128,363 | France | Aug. 20, 1956 |
| 764,791 | Great Britain | Jan. 2, 1957 |